US008221844B2

(12) United States Patent
Ryu et al.

(10) Patent No.: US 8,221,844 B2
(45) Date of Patent: Jul. 17, 2012

(54) WALLPAPER FOR USE IN AN AUTOMOBILE AND A METHOD FOR MAKING SAME

(75) Inventors: SungYong Ryu, Ansung-Si (KR); YongWon Jin, Pyungtaek-si (KR)

(73) Assignee: Carl Freudenberg KG, Weinheim (DE)

( * ) Notice: Subject to any disclaimer, the term of this patent is extended or adjusted under 35 U.S.C. 154(b) by 3 days.

(21) Appl. No.: 12/589,006

(22) Filed: Oct. 16, 2009

(65) Prior Publication Data

US 2010/0038812 A1 Feb. 18, 2010

Related U.S. Application Data

(63) Continuation of application No. 10/866,126, filed on Jun. 11, 2004, now abandoned.

(30) Foreign Application Priority Data

Jul. 10, 2003 (KR) ........................ 10-2003-0046737

(51) Int. Cl.
*B05D 3/02* (2006.01)
*B05D 1/00* (2006.01)
*B05D 7/00* (2006.01)
*B29C 67/00* (2006.01)
*B29C 44/58* (2006.01)

(52) U.S. Cl. ..................... 427/373; 427/421.1; 427/411; 427/407.1; 264/46.4; 264/51

(58) Field of Classification Search ............... 427/372.2, 427/373, 389.9, 421.1, 407.1, 411; 264/46.4, 264/51

See application file for complete search history.

(56) References Cited

U.S. PATENT DOCUMENTS 3,615,972 A * 10/1971 Morehouse et al. ............ 156/79
4,234,641 A * 11/1980 Thompson et al. ........... 428/159
4,320,163 A * 3/1982 Schwartz ...................... 428/158
5,075,407 A * 12/1991 Cody et al. ....................... 528/71
5,356,683 A 10/1994 Egolf et al.
5,360,826 A 11/1994 Egolf et al.
5,885,662 A * 3/1999 Gardner, Jr. .................. 427/426
6,092,464 A * 7/2000 Meola et al. .................. 101/129
6,737,114 B2 * 5/2004 Dawson et al. ............... 427/282
7,273,572 B2 * 9/2007 Cowelchuk et al. ......... 264/46.4
2003/0096058 A1 5/2003 Wirycz et al.

FOREIGN PATENT DOCUMENTS

DE 10052295 A1 4/2002
EP 0563977 A2 10/1993
EP 1254984 A1 * 11/2002
JP 09-104798 A 4/1997

* cited by examiner

*Primary Examiner* — Timothy Meeks
*Assistant Examiner* — Cachet Sellman
(74) *Attorney, Agent, or Firm* — Pearl Cohen Zedek Latzer, LLP

(57) ABSTRACT

An automobile wallpaper, and an exterior surface finishing agent for the door trim, seats, and so on, of automobiles, as well as its manufacturing method. To manufacture such automobile wallpaper, a printing process is performed on the surface of a surface material which is currently being used, in order to render a three-dimensional effect to the surface, so as to achieve various luxurious appearances. The three-dimensional effect of the printing is maintained even during the molding process, and it also possesses excellent properties relative to sound absorbency, due to the three-dimensional effect of the surface.

7 Claims, 3 Drawing Sheets

WALLPAPER FOR USE IN AN AUTOMOBILE AND A METHOD FOR MAKING SAME

This is a continuation application of U.S. patent application Ser. No. 10/866,126 filed Jun. 11, 2004, which claims priority to Korean Patent Application 10-2003-0046737, filed Jul. 10, 2003; all are hereby incorporated by reference herein.

BACKGROUND

The present invention is directed to automobile wallpaper, such as is typically used on seats, door trims and so on, in automobiles, and to methods for manufacturing such wallpaper. Material used for automobile wallpaper can be made from cloth, non-woven fabric, or PVC (polyvinyl chloride), and various processes are carried out with these materials so as to achieve various external appearances and colors. For example, by dyeing and performing print processing on cloth or non-woven fabric, various patterns and colors can be applied to achieve a luxurious effect. In the case of PVC, various surfaces and luxurious effects are achievable by means of embossed processing.

However, foam printing processes, to provide a three-dimensional effect on the surface of the wallpaper, have not been possible for use with materials used as automobile wallpaper. The reason for this is that automobile wallpaper is typically manufactured in mass quantities, at the same size and shape, through the use of molds. Because most mold processing is performed at high temperatures and pressures, printing patterns having three-dimensional effects, formed by means of foam printing, become crushed, and the three-dimensional effect is lost.

SUMMARY OF THE INVENTION

An object of the present invention is to provide an automobile wallpaper having a three-dimensional effect, and methods for manufacturing such a wallpaper.

In one preferred embodiment of the present invention, a wallpaper for use in an automobile and having a three-dimensional surface effect is provided. The wallpaper is formed by providing a wallpaper, and a printing liquid having a foaming agent comprising constituent parts, each comprising a thermoplastic polymer layer forming a cavity having a hydrocarbon gas. According to the present invention, the printing liquid is printed onto the surface of the wallpaper. Thereafter, heat is applied to the printed surface of the wallpaper to cause the hydrocarbon gas of the foaming agent to expand, to thereby provide a three-dimensional appearance to the wallpaper.

In another embodiment of the present invention, a method for manufacturing a wallpaper for use in an automobile is provided. The method comprises the steps of providing a wallpaper, and providing a printing liquid having a foaming agent comprising constituent parts, each comprising a thermoplastic polymer layer forming a cavity having a hydrocarbon gas. Moreover, the method of the present invention includes the steps of printing the printing liquid onto the surface of the wallpaper, and applying heat to the printed surface of the wallpaper to cause the hydrocarbon gas of the foaming agent to expand, to thereby provide a three-dimensional appearance to the wallpaper.

DETAILED DESCRIPTION OF THE PREFERRED EMBODIMENTS

Figure 1:
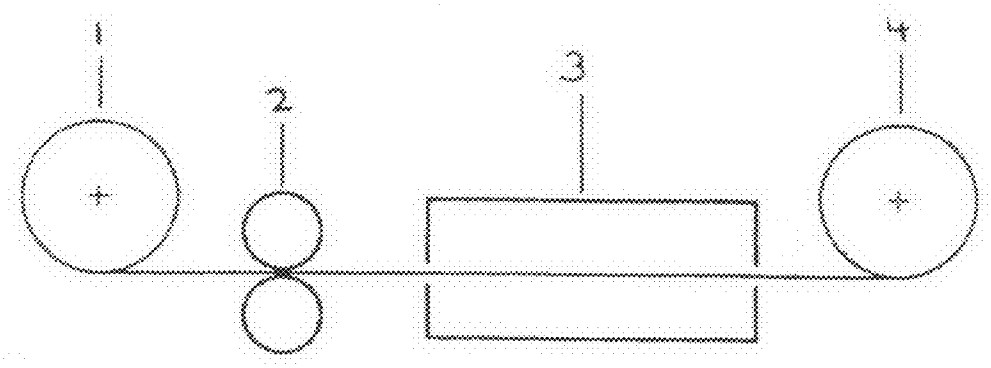
FIG. 1 is a schematic diagram illustrating a foam printing process for manufacturing wallpaper, according to an embodiment of the present invention.

Referring now to the drawings, and initially to FIG. 1, there is illustrated a schematic diagram showing a foam printing process for manufacturing wallpaper, according to an embodiment of the present invention. A roll of automobile wallpaper 1 is feed to a printing device comprising a pair of opposed printing heads 2. According to a feature of the present invention, the ink or printing liquid used at the printing heads 2 comprises a mixture that contains a preselected foaming agent that is able to expand. In the preferred embodiment, the preselected foaming agent contains constituent parts that are able to increase in volume by 30 times upon the application of heat, to give the wallpaper finish a three-dimensional effect.

As shown in FIG. 1, the automobile wallpaper 1, after printing via the printing heads 2, is passed through a heating unit or dryer 3 to apply heat to the foaming agent contained in the ink or printing liquid printed onto the wallpaper 1, so that it expands to provide automobile wallpaper having a three-dimensional effect, that is taken up in a roll 4.

In the preferred embodiment of the present invention, the weight of the wallpaper 4 is from approximately 30 $g/m^2$ to approximately 300 $g/m^2$. Moreover, the printing ink comprises a resin selected from the group consisting of acryl, stylene, polyvinylchloride, polyvinylalcohol, polyester, ethylenevinylchloride, ethylenevinyl acetate or polyurethane and combinations thereof. The resin comprises a base component of the printing ink or liquid applied to the wallpaper 1 in the printing process. It performs the function of attaching the ink and other additives of the ink, such as the preselected foaming agent, to the surface of the wallpaper during the printing process. Moreover, the resin, when it dries, wraps around the foaming agent constituent parts. This helps prevent the destruction of the foaming agent during high-temperature and high-pressure molding processes which the automobile wallpaper is typically exposed to during the manufacturing process.

Various dyes and color inks can be added to the resin, to provide a color effect, as may be desired by an automobile manufacturer. The printing ink can also include various additives, in addition to the foaming agent, dyes and color inks, that are mixed into the resin, such as silicon stabilizers, lubricants, fire retardant agents, thickening agents, and other additives, as is generally known in the art.

Figure 2:
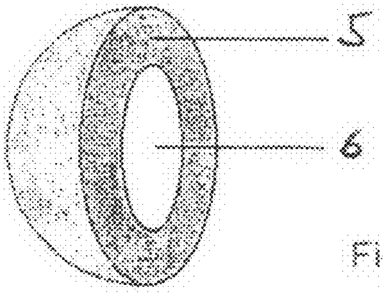
FIG. 2 is a cross-sectional diagram of a constituent part of a preselected foaming agent used in an exemplary embodiment of the present invention.

Referring now to FIG. 2, there is shown a cross-sectional diagram of a constituent part of the preselected foaming agent used in this exemplary embodiment of the present invention.

The preselected foaming agent comprises spherical constituent parts, as shown in FIG. 2, each having a diameter, before expansion, of from approximately 5-50 mm. The exterior layer 5 of each constituent part comprises a thermoplastic polymer layer that provides a cavity containing a hydrocarbon gas 6. The exterior layer 5 is approximately 2-15 mm thick. The thermoplastic polymer comprises a material with sufficient strength to withstand high-temperature and high-pressure exposure during the automobile wallpaper manufacturing process, and thereby protect the three-dimensional effect provided by the expanded foaming agent. To that end, the hydrocarbon gas 6 can expand, upon application of heat in the heating unit or dryer 3, to expand the corresponding foaming agent part 30 times its original volume.

In the preferred embodiment of the present invention, the foaming agent comprises, for example, Expancel® Microsphere brand foaming agent, manufactured by Akzo of Sweden, or Micropearl brand foaming agent, manufactured by Matsumoto, Inc. of Japan. The foaming agent is added to the resin of the printing ink, to comprise approximately 0.2 to 30 percent by weight of the printing liquid applied to the wallpaper 1.

Figure 3:
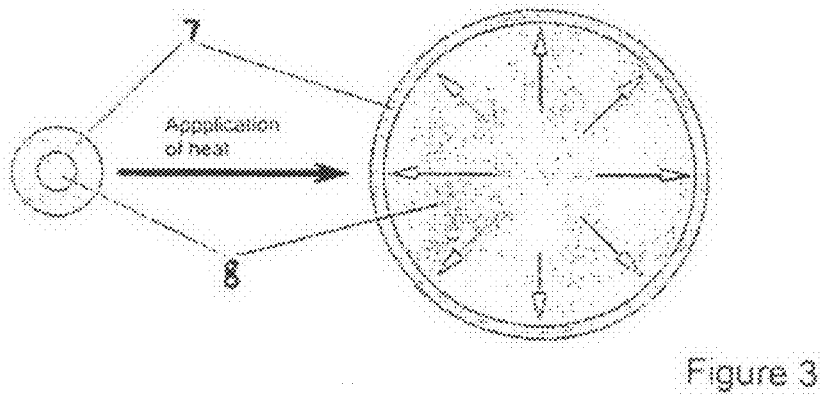
FIG. 3 is a diagram illustrating the expansion of the foaming agent constituent used in an exemplary embodiment of the present invention.

As shown in FIG. 3, upon the application of heat, the hydrocarbon gas 8 expands the thermoplastic exterior layer 7, to increase the volume of each constituent part of the foaming agent approximately 30 times the parts original size. The expansion of the constituent parts of the foaming agent causes the ink layer applied to the wallpaper 1 via the printing heads 2 to acquire a three-dimensional effect for the surface of the wallpaper.

According to the present invention, the print heads 2 can comprise any number of heads, for example, 1-10 print heads. Moreover, it is advantageous to conduct the printing and heating operations of the process continuously. Also, any of the following printing processes can be used to apply the printing liquid to the wallpaper 1: a rotary screen method, a flat screen method or an offset printing method.

Figure 4:
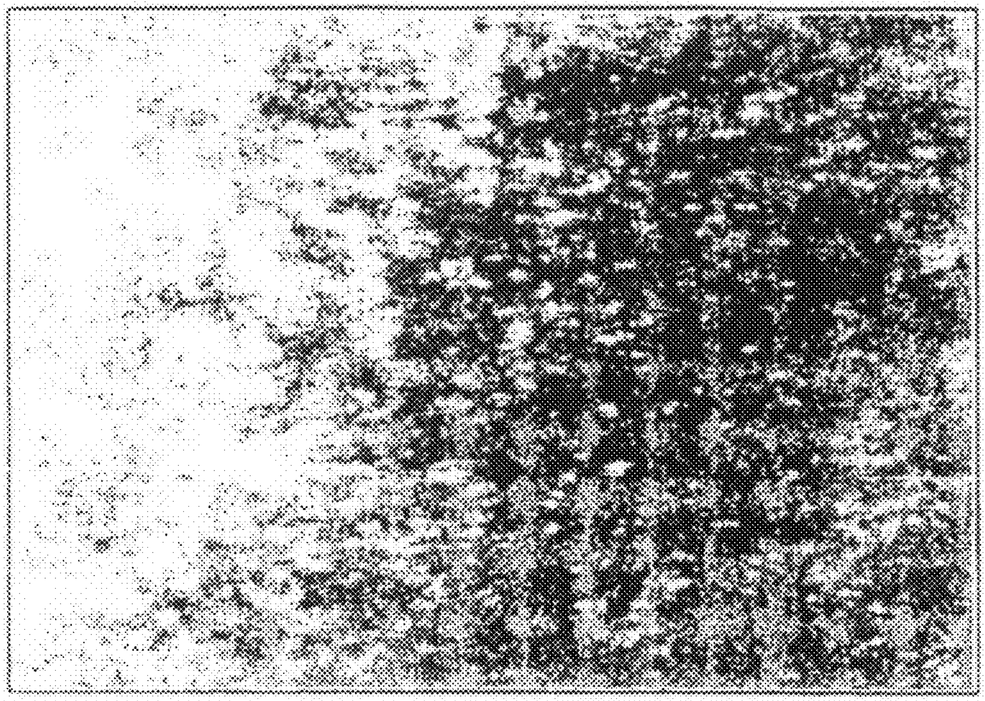
FIG. 4 is an optical microscope photograph of the foaming agent used in an exemplary embodiment of the present invention, shown in a granular state before foaming.
Figure 5:
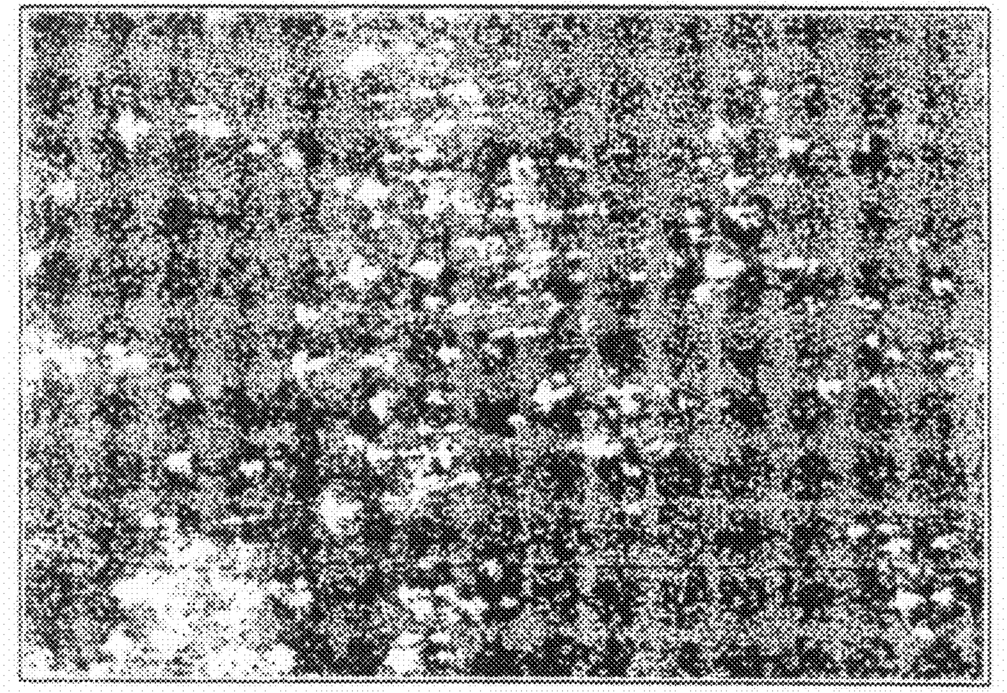
FIG. 5 is an optical microscope photograph of the foaming agent used in an exemplary embodiment of the present invention, shown after it has been heated, foamed and expanded.

FIG. 4 to 7 provide various photos to illustrate the present invention. FIG. 4 is an optical microscope photograph of the foaming agent used in the exemplary embodiment of the present invention, shown in a granular state before foaming caused by the application of heat. FIG. 5 is an optical microscope photograph of the foaming agent, shown after it has been heated, foamed and expanded.

Figure 6:
FIG. 6 is an electron microscope photograph, expanded 200 times, of a wallpaper printed according to the prior art.
Figure 7:
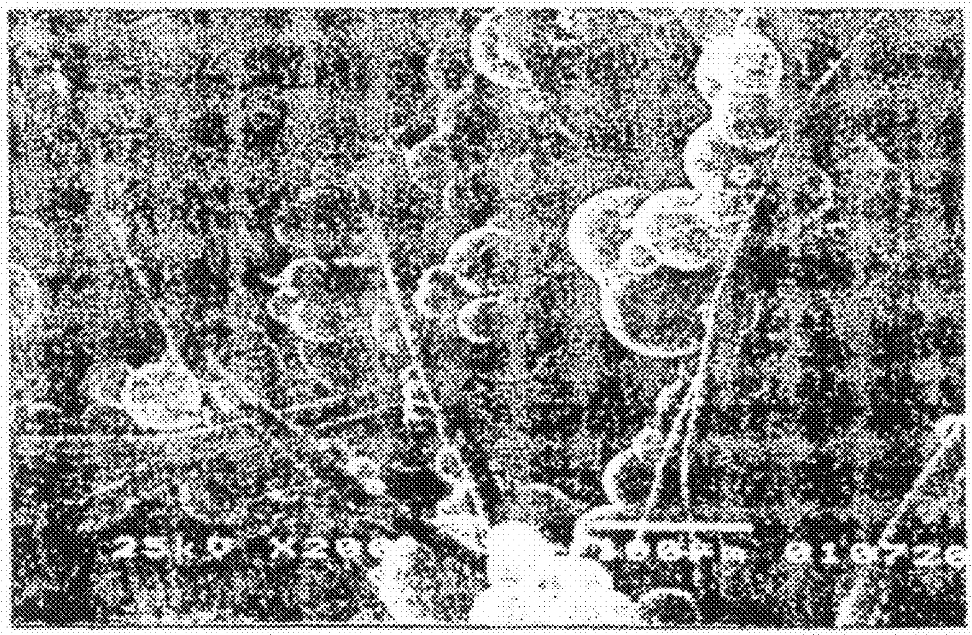
FIG. 7 is an electron microscope photograph, expanded 200 times, of a wallpaper printed according to an embodiment of the present invention.

FIGS. 6 and 7 are electron microscope photographs of automobile wallpapers. FIG. 6 is an electron microscope photograph, expanded 200 times, of a wallpaper printed according to the prior art. FIG. 7 is an electron microscope photograph, expanded 200 times, of a wallpaper printed according to an embodiment of the present invention. The expanded spherical constituent parts of the foaming agent can be seen.

As described above, automobile wallpaper manufactured according to the exemplary embodiment of the present invention utilizes a foaming agent selected for its exterior polymer which expands 30 times in volume when heat is applied, and provides strength to structure forming a three-dimensional print pattern. The use of the selected foaming agent enables the achievement of various desirable results, as follows.

First, when using the selected foaming agent to achieve a three-dimensional effect when printing, the three-dimensional effect of the surface does not change at all during the high-temperature and high-pressure molding process. In existing foam printing, the foaming agent is normally mixed within the printing liquid, and nitrogen gas is given off by the foaming agent when heat is applied, so that the gas is trapped within the printing liquid to form the foam. Therefore, the foam in this kind of foaming agent is destroyed, and breaks down during high-temperature and high-pressure molding. Thus, the three-dimensional effect is lost. However, the foaming agent used in the present invention uses a gas which expands when heat is applied, and is surrounded in a polymer that has a high degree of strength and flexibility so that after the foam forms, there is no destruction of the foam even during the high-temperature and high-pressure molding processes typically encountered in manufacturing the wallpaper. Therefore, the three-dimensional effect of the wallpaper surface can be maintained.

Second, the automobile wallpaper manufactured according to the present invention has improved properties relative to wear resistance and sound absorption of the surface. The foaming agent used in this invention is a polymer with a high degree of strength and flexibility, so that it is very durable against external shocks such as friction. Also, the three-dimensional effect achieved on the surface of the wallpaper results in a two times or greater increase to the size of the surface area, which thereby improves the sound absorption properties of the wallpaper manufactured according to the present invention. It is common knowledge that, if the surface area of a material is large, the sound absorption properties of the material improve. Therefore, if the automobile wallpaper manufactured according to the present invention is applied to automobiles, it will be possible to experience a quieter interior than in automobiles which use currently available types of wallpaper.

Third, automobile wallpapers currently being used have a high defect rate. In the case of cloth, there are many defects and impurities that occur in the weaving process, and these parts are usually discarded as defective. In the case of non-woven fabrics, consecutive sheets are manufactured by joining the fibers using needle punching or water-flow bonding, but partially striped patterns occur due to the needle marks and traces left from water-flow bonding, so that the product quality is reduced. However, if the foam printing process of this invention is carried out to the surface of the wallpaper, the printed patterns expand to a fixed volume, bringing about a three-dimensional form, and this has the effect of covering over the aforementioned defects and reducing the defect rate, rendering it possible to manufacture wallpaper more inexpensively.

Furthermore, the foaming agent used in the present invention is able to achieve the same foaming effect as with existing foaming agents, but does so using a lesser quantity of the agent. The reason for this is that bubbles within existing foaming agents are formed only by the gas caught in the printing liquid, giving off nitrogen gas brought about by heat, so that the remainder of the foaming agent is absorbed by air, which makes it necessary to mix a large amount of foaming agent at the beginning. However, the entire amount of foaming agent selected for use in the present invention contributes to the foam, so the same foaming results can be achieved by using only a relatively small amount of agent. Another advantage is that there are hydrocarbons contained within the thermoplastic resin of the foaming agent used in the present invention. The hydrocarbon content contains fire retardant properties, so separate fire retardant processing is not necessary.

In the preceding specification, the invention has been described with reference to specific exemplary embodiments and examples thereof. It will, however, be evident that various modifications and changes may be made thereto without departing from the broader spirit and scope of the invention as set forth in the claims that follow. The specification and drawings are accordingly to be regarded in an illustrative manner rather than a restrictive sense.

What is claimed is:

1. A method for manufacturing a wallpaper for use in an automobile, comprising the steps of:

providing a wallpaper;

providing a printing liquid having a foaming agent comprising constituent parts having a diameter of approximately 5 to 50 mm, each comprising a thermoplastic polymer layer having a thickness of approximately 2-15 mm forming a cavity having a hydrocarbon gas;

printing the printing liquid onto the surface of the wallpaper, wherein the printing is carried out by using at least two print heads, wherein one print head prints on a first side of the wallpaper and a second print head prints on a second side of the wallpaper opposite to the first side of the wallpaper;

applying heat to the printed surface of the wallpaper to cause the hydrocarbon gas of the foaming agent to expand so as to provide a three-dimensional appearance to the wallpaper by expanding the volume of the thermoplastic polymer layer by at least 30 times; and molding the wallpaper into an automobile part without crushing the three-dimensional appearance of the wallpaper.

2. The method of claim 1 wherein the printing liquid comprises a resin selected from the group consisting of acryl, styrene, polyvinylchloride, polyvinylalcohol, polyester, ethylenevinylchloride, ethylenevinyl acetate or polyurethane and combinations thereof.

3. The method of claim 2 wherein the printing liquid further comprises paint, dye and other additives.

4. The method of claim 1 wherein the foaming agent comprises approximately 0.2 to 30 percent by weight of the printing liquid.

5. The method of claim 1 wherein the step of printing the printing liquid onto the surface of the wallpaper is carried out by a printing process selected from the group consisting of a rotary screen method, a flat screen method and an offset printing method.

6. The method of claim 1 wherein the in the printing liquid is 0.2 to 30 percent by weight foaming agent.

7. The method of claim 1 wherein a hydrocarbon and thermoplastic foaming promoter is inserted within the foaming agent.

* * * * *